(12) United States Patent
Wilms et al.

(10) Patent No.: US 9,062,233 B2
(45) Date of Patent: Jun. 23, 2015

(54) MULTISTAGE PREPARATION OF AQUEOUS POLYMER DISPERSIONS FOR PRODUCING COMPOSITE FILMS

(75) Inventors: Daniel Wilms, Alzey (DE); Karl-Heinz Schumacher, Neustadt (DE); Michael Groβ, Mannheim (DE); Georg Langhauser, Ruppertsberg (DE)

(73) Assignee: BASF SE, Ludwigshafen (DE)

( * ) Notice: Subject to any disclaimer, the term of this patent is extended or adjusted under 35 U.S.C. 154(b) by 809 days.

(21) Appl. No.: 13/156,771

(22) Filed: Jun. 9, 2011

(65) Prior Publication Data
US 2011/0305914 A1     Dec. 15, 2011

Related U.S. Application Data

(60) Provisional application No. 61/353,684, filed on Jun. 11, 2010.

(51) Int. Cl.
| | |
|---|---|
| C08F 8/44 | (2006.01) |
| C08F 6/02 | (2006.01) |
| C08F 2/22 | (2006.01) |
| C09J 133/08 | (2006.01) |
| B32B 7/12 | (2006.01) |
| B32B 27/08 | (2006.01) |
| B32B 27/32 | (2006.01) |
| C08F 265/06 | (2006.01) |
| C08F 285/00 | (2006.01) |

(52) U.S. Cl.
CPC ............... *C09J 133/08* (2013.01); *B32B 7/12* (2013.01); *B32B 27/08* (2013.01); *B32B 27/32* (2013.01); *C08F 2/22* (2013.01); *C08F 265/06* (2013.01); *C08F 285/00* (2013.01); *C08L 2308/00* (2013.01)

(58) Field of Classification Search
CPC ............... C08F 8/44; C08F 6/02; C08F 2/22
USPC .................... 525/327.8; 526/201; 524/460
See application file for complete search history.

(56) References Cited

U.S. PATENT DOCUMENTS

| | | | |
|---|---|---|---|
| 4,325,856 | A | 4/1982 | Ishikawa et al. |
| 6,376,094 | B1 | 4/2002 | Dames et al. |
| 6,727,327 | B1 | 4/2004 | Gerst et al. |
| 2003/0129435 | A1* | 7/2003 | Blankenship et al. ........ 428/515 |

FOREIGN PATENT DOCUMENTS

| | | |
|---|---|---|
| EP | 0 081 083 A2 | 6/1983 |
| EP | 0 338 486 A2 | 10/1989 |
| EP | 1 479 699 A1 | 11/2004 |
| EP | 1780250 A1 * | 5/2007 |
| WO | WO 98/23656 | 6/1998 |
| WO | WO 00/50480 | 8/2000 |
| WO | WO 2008124136 A1 * | 10/2008 |
| WO | WO 2011/003864 A1 | 1/2011 |

OTHER PUBLICATIONS

U.S. Appl. No. 13/237,621, filed Sep. 20, 2011, Gerst, et al.
Extended Search Report issued Feb. 20, 2014 in European Application No. 11792040.5.

* cited by examiner

*Primary Examiner* — Kelechi Egwim
(74) *Attorney, Agent, or Firm* — Oblon, McClelland, Maier & Neustadt, L.L.P.

(57) ABSTRACT

Described is a process for preparing an aqueous polymer dispersion from ethylenically unsaturated, free-radically polymerizable monomers. In a first stage, a first polymer is prepared by free-radical emulsion polymerization. In a second stage, an aqueous polymer dispersion is prepared in the presence of the first polymer. The monomers of the first stage comprise monomers with acid groups. The polymerization of the first stage takes place at a low pH of less than 5. The acid groups of the first polymer are neutralized during the polymerization of the second stage to an extent such that the pH of the polymer dispersion at the end of the second stage is greater than 5. The aqueous polymer dispersions can be used as adhesives for producing composite films.

13 Claims, No Drawings

MULTISTAGE PREPARATION OF AQUEOUS POLYMER DISPERSIONS FOR PRODUCING COMPOSITE FILMS

CROSS-REFERENCE TO RELATED APPLICATIONS

This application is based upon and claims the benefit of priority to U.S. Provisional Application No. 61/353,684 filed on Jun. 11, 2010, the contents of which are incorporated herein by reference in their entirety.

BACKGROUND OF THE INVENTION

The invention relates to a process for preparing an aqueous polymer dispersion from ethylenically unsaturated, free-radically polymerizable monomers, where, in a first stage, a first polymer is prepared by free-radical emulsion polymerization. In a second stage, an aqueous polymer dispersion is prepared in the presence of the first polymer. The monomers of the first stage comprise monomers with acid groups. The polymerization of the first stage takes place at a relatively low pH and the acid groups of the first polymer are neutralized only during the polymerization of the second stage. The aqueous polymer dispersions can be used as adhesives for producing composite films.

There exists a high demand for inexpensive adhesives for composite film lamination with good performance properties, for flexible food packaging, for example. Adhesive systems based on organic solvents have been used, but, in order to reduce emissions of organic solvents, water-based additive systems are preferred. Particular significance is possessed by acrylate ester polymer dispersions, also known as acrylic latex. Adhesives based on acrylate ester are described in WO 98/23656 and in WO 00/50480, for example. Frequently, the peel strengths are still capable of being improved. Particularly in the case of acrylate ester polymer dispersions prepared by emulsion polymerization with use of emulsifiers, the peel strength may be adversely affected by the emulsifier necessarily present. It is known in principle to carry out emulsion polymerization substantially without emulsifiers as well, if protective colloids are used in place of the emulsifiers. Typical protective colloids are polymers which contain acid groups and which, when the acid groups are neutralized, are water-soluble at elevated pH levels. At elevated pH levels and at the typically elevated temperatures at which emulsion polymerizations are carried out, however, there may be unwanted side reactions in the form of hydrolyses of the acrylate esters. The byproducts that form to a small extent in such reactions may in turn adversely affect the peel strength of composite films. The object was to prepare aqueous polymer dispersions which can be used to produce composite films having very good instantaneous adhesion and very good heat stability.

It has been found that the object can be achieved by the preparation process elucidated in more detail below and by the polymer dispersions obtainable by said process. The invention provides a process for preparing an aqueous polymer dispersion, where initially in a first stage in aqueous medium a first polymer dispersed in water is prepared by free-radical emulsion polymerization, the first polymer being prepared from a first composition comprising ethylenically unsaturated, free-radically polymerizable monomers, and where subsequently in a second stage a polymer dispersion is prepared in aqueous medium and in the presence of the first polymer by free-radical emulsion polymerization of a second composition, which is different from the first composition and comprises ethylenically unsaturated, free-radically polymerizable monomers, where the monomers of the first stage comprise at least one monomer having at least one acid group, in an amount of at least 0.1 part by weight, based on the total amount of monomers of the first and second stages, and where the polymerization of the first stage takes place at a pH less than 5, preferably less than or equal to 4.5, and, during the polymerization of the second stage, the acid groups of the first polymer are neutralized to an extent such that the pH of the polymer dispersion at the end of the second stage is greater than 5, preferably greater than or equal to 5.5.

The process described encompasses the preparation of polyacrylate dispersions in particular for application in composite film lamination, by a specially adapted "one-pot" process which is based on the stabilization of emulsion polymers by protective colloids formed in situ, i.e., during the emulsion polymerization.

The principle of the process of the invention is based on the preferably seed-controlled formation of small polymer particles in aqueous dispersion in a first polymerization stage by free-radical polymerization of a first monomer composition comprising at least one ethylenically unsaturated monomer having at least one acid group (e.g., a mixture of alkyl (meth) acrylate and (meth)acrylic acid) and also subsequent neutralization, taking place in parallel in a second polymerization stage, and feeding of the principal monomers, such as, for example, of a mixture of ethyl acrylate, n-butyl acrylate, methyl methacrylate, and optionally styrene. Following neutralization, the particles formed in the first stage are able to pass into solution and, as protective colloids, are able to stabilize the polymer dispersion of the invention. At the beginning of the reaction of the first stage, the pH in the reaction vessel falls continually as a result of continuous addition of acid. As a result of this, the polymer particles formed in the first polymerization stage are undissolved. Only with increasing neutralization during the second polymerization stage (e.g., by addition of ammonia) do the polymer particles formed initially pass into solution and, accordingly, constitute protective colloids which are able to act as dispersion-stabilizing protective colloids in the emulsion polymerization that commences with addition of the principal monomers, since said polymer particles are composed preferably of apolar alkyl (meth)acrylate units and polar (meth)acrylic acid units.

The invention also provides aqueous polymer dispersions prepared by the process of the invention, the use of the aqueous polymer dispersions of the invention for producing composite films, composite films produced using an adhesive comprising an aqueous polymer dispersion of the invention, and a corresponding process for producing composite films.

The polymer dispersions prepared in accordance with the invention are obtainable by free-radical emulsion polymerization of ethylenically unsaturated compounds (monomers). The polymerization both of the first stage and of the second stage takes place preferably with no emulsifier or with little emulsifier in the sense that no emulsifier is added to stabilize the polymer dispersion of the invention. Emulsifiers are non-polymeric, amphiphilic, surface-active substances that are added to the polymerization mixture. Small amounts of emulsifiers, present as a result, for example, of the use of emulsifier-stabilized polymer seed, are not detrimental. It is preferred that, in total, less than 1% or less than 0.5% by weight of emulsifier is used, more particularly less than 0.3% by weight or less than 0.2% by weight, based on the solids content of the polymer dispersion, or no emulsifier.

In the first stage a polymer is prepared from monomers which comprise at least one monomer having at least one acid group, in an amount of at least 0.1 part by weight, preferably from 1 to 10 parts by weight, based on the total amount of monomers of the first and second stages. Preferably, in the first stage, monomers containing acid groups (acid monomers) are copolymerized with monomers without acid groups, more particularly nonionic monomers. The weight ratio of monomers containing acid groups to monomers without acid groups in the monomer mixture of the first polymerization stage is preferably in the range from 0.5:99.5 to 30:70, preferably from 1:99 to 20:80 or from 5:95 to 15:85.

At low pH levels of 2 to 3, for example, and with normeutralized acid groups, the polymer of the first stage is not water-soluble, but is dispersed in water. If neutralizing agent is added during the polymerization of the second stage, there is a successive increase, with increasing degree of neutralization of the acid groups, in the water-solubility of the polymer of the first stage. With increasing water solubility, the polymer of the first stage is able increasingly to act as a protective colloid for the polymer of the second stage and, toward the end of the polymerization, is able to stabilize the polymer dispersion with high polymer solids content. Protective colloids are polymeric compounds which, on solvation, bind large amounts of water and are capable of stabilizing dispersions of water-insoluble polymers. In contrast to emulsifiers, they generally do not lower the interfacial tension between polymer particles and water. The number-average molecular weight of the protective colloids is preferably above 1000 g/mol, more particularly above 2000 g/mol, and preferably up to 50 000 g/mol or up to 10 000 g/mol. As for example from 1000 to 100 000 g/mol, from 1000 to 10 000 g/mol or from 2000 to 10 000 g/mol.

The polymers of the first stage that become effective as protective colloids on neutralization are used preferably in an amount of 1% to 60% or of 5% to 50% by weight, or of 7% to 40% or of 10% to 30% by weight (particularly when the total solids content of the polymer dispersion of the invention is more than 50% by weight), based on 100% by weight of the monomers to be polymerized.

The acid groups of the polymer of the first stage may be neutralized partially or completely with suitable bases. It is preferred to use aqueous sodium hydroxide or potassium hydroxide solution, or ammonia, as neutralizing agent.

The acid monomers used in the first stage can be copolymerized with monomers without acid group. The polymer of the first stage is preferably formed from at least 40% by weight of nonionic principal monomers, defined in more detail below, and also from a second kind of monomer, selected from ethylenically unsaturated acid monomers. The polymer of the first stage may, furthermore, optionally be formed from further, preferably nonionic, monomers. The polymer of the first stage is preferably constructed of at least 40%, more particularly of 40% to 80% or of 50% to 80%, by weight of principal monomers which are selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Principal monomers for the polymer of the first stage are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene. Preferred as principal monomers for the polymer of the first stage are the $C_1$ to $C_{10}$ alkyl acrylates and methacrylates, more particularly $C_1$ to $C_8$ alkyl acrylates and methacrylates. Ethyl acrylate is especially preferred.

The polymer of the first stage is further composed, preferably, of at least 5%, more particularly of 6% to 50% or of 7% to 25%, by weight of ethylenically unsaturated acid monomers. Ethylenically unsaturated acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropane-sulfonic acid, sulfopropyl acrylate, and sulfopropyl methacrylate. Preference is given to acrylic acid and methacrylic acid and a mixture thereof, and acrylic acid is particularly preferred.

In one preferred embodiment the polymer of the first stage is a copolymer which
(i) in used in an amount of 5% to 40% by weight, based on 100 parts by weight of the total monomers to be polymerized in the first and second stages,
(ii) is composed of at least 50% and up to 95% by weight of principal monomers which are selected from the group consisting of C1 to C10 alkyl (meth)acrylates and mixtures of these monomers, especially ethyl acrylate, and
(iii) is composed of at least 5% and up to 30% by weight of ethylenically unsaturated acid monomers, which are preferably selected from acrylic acid, methacrylic acid, and a mixture thereof.

One embodiment of the invention uses at least one molecular weight regulator in the polymerization of the first stage. By means of such a regulator it is possible to reduce the molar mass of the emulsion polymer, by a chain termination reaction. The regulators are attached in the process to the polymer, generally to the chain end. The amount of regulators is in particular 0.05 to 4 parts by weight, more preferably 0.05 to 0.8 part by weight, and very preferably 0.1 to 0.6 part by weight, based on 100 parts by weight of the monomers to be polymerized. Examples of suitable regulators include compounds having a thiol group such as tert-butyl mercaptan, thioglycolic acid ethylacrylic ester, mercaptoethanol, mercaptopropyltrimethoxysilane or tert-dodecyl mercaptan. The regulators are generally low molecular weight compounds with a molar weight of less than 2000, more particularly less than 1000, g/mol.

In one preferred embodiment of the invention, the polymerization of the first stage takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of the first and second stages. A suitable latex, for example, is one based on polystyrene or based on polymethyl methacrylate. A preferred seed latex is polystyrene seed.

Preferably at least 60%, more preferably at least 80%, e.g., from 80% to 100%, more preferably at least 90% or 100%, by weight of the monomers used for the polymerization of the second stage comprise one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms, and one or two double bonds, or mixtures of these monomers.

Examples include (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth) acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decyl-styrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene.

Preferred as principal monomers for the polymerization of the second stage are the $C_1$ to $C_{10}$ alkyl acrylates and methacrylates, more particularly $C_1$ to $C_8$ alkyl acrylates and methacrylates, and vinylaromatics, especially styrene, and mixtures thereof. Very particular preference is given to methyl acrylate, methyl methacrylate, ethyl acrylate, n-butyl acrylate, n-butyl methacrylate, n-hexyl acrylate, octyl acrylate, and 2-ethylhexyl acrylate, 2-propylheptyl acrylate, styrene, and mixtures of these monomers.

Besides the principal monomers, the monomers for the polymerization of the second stage may comprise further monomers, examples being monomers with carboxylic acid, sulfonic acid or phosphonic acid groups. Carboxylic acid groups are preferred. Examples include acrylic acid, methacrylic acid, itaconic acid, maleic acid, and fumaric acid. Further monomers are also, for example, monomers comprising hydroxyl groups, especially $C_1$-$C_{10}$ hydroxyalkyl (meth) acrylates, and also (meth)acrylamide. Further monomers that may be mentioned are, moreover, phenyloxyethylglycol mono(meth)acrylate, glycidyl acrylate, glycidyl methacrylate, and amino (meth)acrylates such as 2-aminoethyl (meth) acrylate. Crosslinking monomers are further monomers that may also be mentioned. The monomers used in the second stage preferably comprise less than 1% by weight or no monomers with acid groups.

In particular, the monomers for the polymerization of the second stage are selected to an extent of at least 60%, more preferably at least 80%, e.g., from 60% to 100%, and very preferably at least 95% or 100%, by weight, of at least one $C_1$ to $C_{20}$ alkyl acrylate, at least one $C_1$ to $C_{20}$ alkyl methacrylate, a mixture thereof, or a mixture thereof with styrene.

In one embodiment, the monomer with at least one acid group that is used in the first stage is acrylic acid; the monomer without an acid group that is used in the first stage is ethyl acrylate; and at least 80% by weight of the monomers used in the second stage are selected from the group consisting of C1 to C10 alkyl acrylates, C1 to C10 alkyl methacrylates, styrene, and a mixture thereof.

The monomers of the polymerization in the second stage are preferably selected such that the glass transition temperature, calculated for a polymer prepared from the monomers of the second stage, is in the range from −19° C. to +15° C., more particularly from −15° C. to +10° C. By a controlled variation of the nature and amount of the monomers it is possible in accordance with the invention for the skilled person to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123, and in accordance with Ullmann's Encyclopädie der technischen Chemie, Volume 19, page 18, 4th Edition, Verlag Chemie, Weinheim, 1980), the calculation of the glass transition temperature of copolymers is subject in good approximation to the following equation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed in Ullmann's Encyclopedia of Industrial Chemistry, Vol. A21, page 169, 5th Edition, VCH Weinheim, 1992; other sources of glass transition temperatures of homopolymers include, for example, J. Brandrup, E. H. Immergut, Polymer Handbook, 1st Edition, J. Wiley, New York 1966, 2nd Edition, J. Wiley, New York 1975, and 3rd Edition, J. Wiley, New York 1989. For ethyl acrylate a figure of −13° C. is used.

The actual glass transition temperature of the polymer in the polymer dispersion of the invention (first and second stages) is preferably in the range from −15° C. to +15° C. The actual glass transition temperature may be determined by means of differential scanning calorimetry (ASTM D 3418-08, midpoint temperature).

The weight ratio of the amount of the monomers used in the first stage to the amount of the monomers used in the second stage is preferably from 5:95 to 50:50 or from 5:95 to 40:60, more preferably from 10:90 to 30:70.

The polymer dispersion of the invention is prepared by emulsion polymerization. In the emulsion polymerization, ethylenically unsaturated compounds (monomers) are polymerized in water, with the use typically of ionic and/or nonionic emulsifiers and/or protective colloids or stabilizers as interface-active compounds for stabilizing the monomer droplets and the polymer particles subsequently formed from the monomers. In accordance with the invention, however, both the polymerization of the first stage and the polymerization of the second stage take place wholly or virtually without emulsifier. For the stabilization of the polymer dispersion formed in the polymerization of the second stage, the polymer of the first stage is used, which is converted in situ, by addition of neutralizing agent, from a water-insoluble polymer which is not active as a protective colloid, into a water-soluble polymer which is active as a protective colloid.

The neutralization of acid groups of the first polymer takes place preferably by feed addition of a neutralizing agent during the polymerization of the second stage, the feed of neutralizing agent taking place preferably in parallel with the monomer feed. The neutralizing agent may be added in a joint feed with the monomers to be polymerized, or in a separate feed. After all of the monomers have been fed in, the amount of neutralizing agent present in the polymerization vessel is preferably the amount needed to neutralize at least 10%, preferably 30% to 100% or 30% to 90%, of acid equivalents.

The emulsion polymerization of the first and second stages may be started using water-soluble initiators. Water-soluble initiators are, for example, ammonium salts and alkali metal salts of peroxodisulfuric acid, e.g., sodium peroxodisulfate, hydrogen peroxide, or organic peroxides, e.g., tert-butyl hydroperoxide. Also suitable as initiators are what are called reduction-oxidation (redox) initiator systems. The redox initiator systems are composed of at least one, usually inorganic, reducing agent and one organic or inorganic oxidizing agent. The oxidizing component comprises, for example, the emulsion polymerization initiators already stated above. The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydromethanesulfinic acid and its salts, or ascorbic acid. The redox initiator systems may be used in conjunction with soluble metal compounds whose metallic component is able to occur in a plurality of valence states. Typical redox initiator systems are, for example, ascorbic acid/iron(II) sulfate/sodium peroxydisulfate, tert-butyl hydroperoxide/sodium disulfite, and tert-butyl hydroperoxide/Na hydroxymethanesulfinic acid. The individual components, the reducing component for example, may also be mixtures, an example being a mixture of the sodium salt of hydroxymethanesulfinic acid with sodium disulfite.

The stated initiators are used mostly in the form of aqueous solutions, with the lower concentration being determined by the amount of water that is acceptable in the dispersion, and the upper concentration by the solubility of the respective compound in water. Generally speaking, the concentration of the initiators is 0.1% to 30%, preferably 0.5% to 20%, more preferably 1.0% to 10%, by weight, based on the monomers to be polymerized. It is also possible for two or more different initiators to be used in the emulsion polymerization.

The molecular weight regulators stated above may be used in the polymerization of the second stage. Preferably, however, the polymerization of the second stage takes place without addition of further molecular weight regulators.

The emulsion polymerization takes place in general at 30 to 130° C., preferably at 50 to 90° C. the polymerization medium may be composed of water alone, or of mixtures of water and water-miscible liquids such as methanol. It is preferred to use just water. The emulsion polymerization of the first stage may be carried out either as a batch operation or in the form of a feed process, including staged or gradient procedures. For more effective setting of the particle size it is preferred, in the polymerization, to include a polymer seed in the initial charge.

The way in which the initiator is added to the polymerization vessel in the course of the free-radical aqueous emulsion polymerization is known to a person of ordinary skill in the art. It may be included in its entirety in the initial charge to the polymerization vessel, or introduced, continuously or in stages, at the rate at which it is consumed in the course of the free-radical aqueous emulsion polymerization. In each individual case, this will depend on the chemical nature of the initiator system and on the polymerization temperature. It is preferred to include a portion in the initial charge and to supply the remainder to the polymerization zone at the rate of its consumption. For the purpose of removing the residual monomers, it is customary to add initiator after the end of the actual emulsion polymerization as well, i.e., after a monomer conversion of at least 95%. The individual components may be added to the reactor, in the case of the feed process, from above, in the side or from below, through the reactor bottom.

The emulsion polymerization produces aqueous polymer dispersions having solids contents generally of 15% to 75%, preferably of 40% to 75%, and more preferably of greater than or equal to 50%, by weight. For a high space/time yield of the reactor, dispersions with a very high solids content are preferred. In order to be able to attain solids contents >60% by weight, a bimodal or polymodal particle size ought to be set, since otherwise the viscosity becomes too high and the dispersion can no longer be handled. Producing a new generation of particles can be accomplished, for example, by adding seed (EP 81083), by adding excess amounts of emulsifier, or by adding miniemulsions. A further advantage associated with the low viscosity at high solids content is the improved coating behavior at high solids contents. Producing one or more new generations of particles can be done at any desired point in time. This point in time is guided by the particle size distribution that is aimed at for a low viscosity.

The polymer prepared in this way is used preferably in the form of its aqueous dispersion. The size distribution of the dispersion particles may be monomodal, bimodal or multimodal. In the case of monomodal particle size distribution, the average particle size of the polymer particles dispersed in the aqueous dispersion is preferably less than 400 nm, more particularly less than 200 nm. By average particle size here is meant the $d_{50}$ of the particle size distribution, i.e., 50% by weight of the total mass of all the particles have a particle diameter smaller than the $d_{50}$. The particle size distribution can be determined in a known way using the analytical ultracentrifuge (W. Mächtle, Makromolekulare Chemie 185 (1984), pages 1025-1039). In the case of bimodal or multimodal particle size distribution, the particle size may be up to 1000 nm. The pH of the polymer distribution is set preferably to a pH of more than 5, more particularly to a pH between 5.5 and 8.

The polymer dispersions of the invention are used in accordance with the invention in aqueous adhesive preparations for the production of laminates, i.e., in aqueous laminating adhesive preparations for the bonding of substrates of large surface areas, more particularly for the production of composite films.

The present invention hence also provides a process for producing composite films by using an aqueous adhesive preparation which comprises at least one polymer dispersion of the invention. In this process, the aqueous polymer dispersions may be used as they are or after formulation with typical auxiliaries. Examples of typical auxiliaries include wetting agents, thickeners, other protective colloids, light stabilizers, biocides, defoamers, etc. The adhesive preparations of the invention do not require the addition of plasticizing resins (tackifiers) or other plasticizers. In the process for producing composite films, at least two films are bonded with one another using the aqueous polymer dispersion.

In the process of the invention for producing composite films, the polymer dispersion of the invention, or an appropriately formulated preparation, is applied to the large-surface-area substrates to be bonded, preferably with a layer thickness of 0.1 to 20 $g/m^2$, more preferably 1 to 7 $g/m^2$, by means, for example, of knife coating, spreading, etc. Typical coating techniques may be employed, examples being roller coating, reverse roller coating, gravure roller coating, reverse gravure roller coating, brush coating, rod coating, spray coating, air brush coating, meniscus coating, curtain coating or dip coating. After a short time for the water of the dispersion to evaporate (preferably after 1 to 60 seconds), the coated substrate may then be laminated with a second substrate, the temperature being able, for example, to be 20 to 200° C., preferably 20 to 100° C., and the pressure being able to be, for example, 100 to 3000 $kN/m^2$, preferably 300 to 2000 $kN/m^2$.

The polymer dispersion of the invention is employed preferably as a one-component composition, i.e., without additional crosslinking agents, more particularly without isocyanate crosslinkers. However, the polymer dispersion of the invention can also be used as a two-component adhesive, where a crosslinking component is added, such as a water-emulsifiable isocyanate, for example. At least one of the films may be metalized or printed on the side that is coated with adhesive. Examples of suitable substrates include polymer films, more particularly of polyethylene (PE), oriented polypropylene (OPP), unoriented polypropylene (CPP), polyamide (PA), polyethylene terephthalate (PET), polyacetate, cellophane, polymer films (vapor-)coated with metal, e.g., with aluminum (metalized films for short) or metal foils, of aluminum, for example. The stated films and foils may be bonded with one another or with a foil or film of a different type—for example, polymer films with metal foils, different polymer films with one another, etc. The stated foils and films may also, for example, be printed with printing inks.

One embodiment of the invention is a composite film produced using one of the aqueous polymer dispersions of the invention as described above, the material of a first film being selected from OPP, CPP, PE, PET, and PA, and the material of a second film being selected from OPP, CPP, PE, PET, PA, and metal foil. In one embodiment of the invention, the first film and/or the second film is metalized or printed on the respective side coated with the polymer dispersion of the invention. The thickness of the substrate films may be, for example, from 5 to 100 µm, preferably from 5 to 40 µm.

Surface treatment of the film substrates prior to coating with a polymer dispersion of the invention is not absolutely necessary. Better results, however, may be obtained if the surface of the film substrates is modified prior to coating. In this case it is possible to employ typical surface treatments, an example being corona treatment, for the purpose of intensifying the adhesion effect. The corona treatment or other surface treatments are carried out to the extent required for sufficient wettability with the coating composition. Typically, corona treatment of approximately 10 watts per square meter per minute is sufficient for this purpose. Alternatively or additionally it is also possible, optionally, to use primers or tie coats between film substrate and adhesive coating. Furthermore, other, additional functional layers may be present on the composite films, examples being barrier layers, print layers, color layers or varnish layers, or protective layers. These functional layers may be located externally, i.e., on the side of the film substrate facing away from the adhesive-coated side, or internally, between film substrate and adhesive layer.

It is an advantage of the invention that a wide variety of different substrates can be bonded with one another, i.e., laminated, with the polymer dispersions of the invention ensuring effective adhesion of the adhesive preparation to the substrates and producing a high strength in the bonded assembly. Moreover, the polymer dispersions of the invention are notable for good instantaneous adhesion and good heat stability.

Particular advantages of the preparation process of the invention and of the products of the invention are the following in particular:

improved peel strengths as compared with conventionally prepared polymer dispersions for composite film lamination, particularly immediately after laminating (instantaneous strength) and at the same time at elevated temperatures (heat stability)

virtually emulsifier-free operation is possible (small amounts of emulsifier when using an emulsifier-stabilized polymer seed are not detrimental)

simplicity of the process (no need for metered addition of initiator)

substantial avoidance of hydrolysis of acrylate monomers, owing to the comparatively low pH level, as compared with conventionally prepared acrylate polymer dispersions cost saving by comparison with other protective colloid-stabilized polymer dispersions, since, because of the in situ preparation of the protective colloid, there is no need for separate synthesis, transport, and storage of the protective colloid extensive variability of the process in respect of the composition of the protective colloid that can be used (polymer of the first stage) and of the overall composition of the polymer dispersion.

EXAMPLES

A 4 l vessel with anchor stirrer, heated to 80° C., is charged with 9 g of polystyrene seed dispersion (concentration: 33%, particle size=30 nm) and 770 g of fully demineralized water. Then 71 g of sodium peroxodisulfate solution (7% strength in water) are added and the mixture is stirred at 80° C. for 2 minutes. This is followed by the addition over 40 minutes of a mixture of 175 g of ethyl acrylate, 25 g of methacrylic acid and 3.5 g of 2-ethylhexyl thioglycolate. After polymerization of the first polymerization stage for 20 minutes, the second polymerization stage is commenced, by commencement simultaneously of the principal monomer feed (600 g of ethyl acrylate, 80 g of n-butyl acrylate and 120 g of methyl methacrylate, 24 g of fully demineralized water; metering over 1.5 hours) and of the neutralizing feed (14 g of ammonia, 100 g of fully demineralized water; metering over 2.5 hours). Finally, polymerization is continued at 80° C. for 2 hours, followed by cooling and filtering.

Polymer Dispersions P1-P7

Polymer dispersions P1 to P7 are prepared similarly. In these cases, 17.5 parts by weight of ethyl acrylate and 2.5 parts by weight of acrylic acid are used in the first polymerization stage. In the second polymerization stage, the monomer compositions indicated in Table 1 are used. The quantity figures relate to parts by weight.

Comparative Polymer Dispersion P8-9

These are prepared in the same way as for P1-P7. In the second polymerization stage, the monomer compositions indicated in Table 1 are used.

Comparative Polymer Dispersion P10 (Containing Emulsifier)

Polymer dispersion P10 was prepared as described above and with the same monomers as polymer dispersion P2, with the difference that additionally 1.5 parts by weight of emulsifier (Maranil® A20; sodium n-C10-C30-alkylbenzenesulfonate) were used to stabilize the polymer dispersion.

Comparative Polymer Dispersion P11 (Containing Emulsifier, One Stage)

Polymer dispersion P11 was prepared as described above and with the same monomers as polymer dispersion P2, with the difference that the total amounts of ethyl acrylate and acrylic acid were supplied together with the other monomers simultaneously in a single polymerization stage. The polymer dispersion was stabilized using an emulsifier (1.5 parts by weight of Maranil® A20 sodium n-C10-C30-alkylbenzenesulfonate).

TABLE 1

Monomer composition of the second polymerization stage

| Example | EA | MMA | S | nBA | AA | Tg [° C.] |
|---------|------|-----|----|-----|-----|-----------|
| P1 | 60 | | 12 | 8 | | −4 |
| P2 | 60 | 12 | | 8 | | −4 |
| P3 | 68 | 12 | | 5 | | 0 |
| P4 | 68 | | 12 | | | 0 |
| P5 | 63 | 17 | | | | 6 |
| P6 | 60 | 20 | | | | 9 |
| P7 | 60 | | 20 | | | 9 |
| P8 | 46 | 34 | | | | 21 |
| P9 | 39 | 41 | | | | 29 |
| P10 | 60 | 12 | | 8 | | −4 |
| P11 [1)] | 77.5 | 12 | | 8 | 2.5 | −4 |

[1)] polymerized in a single stage
EA: ethyl acrylate;
MMA: methyl methacrylate;
S: styrene;
nBA: n-butyl acrylate;
AA: acrylic acid
Tg: calculated glass transition temperature for a polymer comprising the monomers of the second stage Production of Composite Films:

The neutralized polymer dispersions are knife-coated in a dry film thickness of 2 g/m² (based on the solids content) onto commercial films (OPP-ink; printed oriented polypropylene). After hot-air drying, the films thus coated are rolled up with a second film (metalized CPP) and then compressed under a pressure of 6.5 bar and at 70° C. in a roller press at 5 m/min. The composite films are subsequently stored for 1 day at room temperature under standard conditions.

Determination of Peel Strength (Instantaneous Adhesion and Heat Stability):

For the determination of the peel strength, the composite films are cut up into strips 15 mm wide. The strips are then peeled at an angle of 180° and at a speed of 100 mm/min at 23° C. in a universal testing machine for peel strengths, from Zwick (model 1120.25.01), and the force required to achieve this is recorded, in newtons. To determine the instantaneous adhesion, the peel strength was recorded after 1 minute at 23° C. To determine the heat stability, the peel strength was recorded at 90° C. The results are compiled in Table 2.

TABLE 2

Test results, peel strength

| Example | Instantaneous adhesion [N/15 mm] | Heat stability at 90° C. [N/15 mm] |
|---------|----------------------------------|------------------------------------|
| P1 | 0.7 | 0.6 |
| P2 | 0.8 | 0.6 |
| P3 | 0.9 | 0.6 |
| P4 | 1.0 | 0.7 |
| P5 | 1.0 | 0.8 |
| P6 | 0.6 | 1.1 |
| P7 | 0.6 | 0.8 |
| P8 | 0.05 | 1.1 |
| P9 | 0.05 | 1.2 |
| P10 | 0.1 | 0.5 |
| P11 | 0.2 | 0.4 |

The desire is for systems where, preferably, both values, for instantaneous adhesion and for heat stability, are above 0.5 N/15 mm. For the inventive examples P1-P7, this is the case. For the noninventive examples P8-P11, this is not the case.

Comparative polymer dispersions prepared in emulsifier-free form as described above, with the difference that the total amounts of ethyl acrylate and acrylic acid were supplied together with the other monomers at the same time in a single polymerization stage, i.e., without formation of protective colloid in situ, will result in dispersions with a high coagulum content.

US Provisional/Patent Application No. 61/353,684, filed Jun. 11, 2010, is incorporated into the present specification by literature reference. In light of the teachings identified above, numerous modifications of and deviations from the present invention are possible. It may therefore be assumed that the invention, within the remit of the appended claims, may be practiced otherwise than as specifically described herein.

The invention claimed is:

1. A process for preparing an aqueous polymer dispersion, the process comprising:
    preparing a first polymer dispersed in water by free-radical emulsion polymerization in an aqueous medium from a first composition comprising an ethylenically unsaturated, free-radically polymerizable monomer; and
    subsequently preparing a polymer dispersion in aqueous medium and in the presence of the first polymer by free-radical emulsion polymerization of a second composition, which is different from the first composition and comprises an ethylenically unsaturated, free-radically polymerizable monomer,
    wherein:
    the monomer in the preparing of the first polymer comprises a monomer comprising an acid group, said monomer being present in an amount of at least 0.1 part by weight, based on a total amount of monomers in preparing the polymer dispersion;
    the preparing of the first polymer occurs at a pH less than 5; and
    the preparing of the polymer dispersion further comprises neutralizing acid groups of the first polymer to an extent such that a pH of the polymer dispersion is greater than 5,
    wherein the neutralizing comprises feed addition of a neutralizing agent while preparing the polymer dispersion, and the neutralization is performed simultaneously with the polymerization of the second composition.

2. The process according to claim 1, wherein the process employs no emulsifier or a total of less than 0.5% by weight of emulsifier, based on a solids content of the polymer dispersion.

3. The process according to claim 1, wherein:
    the preparing of the first polymer comprises copolymerizing the monomer comprising an acid group with a monomer that does not comprise an acid group; and
    a weight ratio of monomers comprising acid groups to monomers without acid groups is from 5:95 to 15:85.

4. The process according to claim 1, wherein:
the monomer comprising an acid group is at least one selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate, and any mixture thereof; and
the monomer in the preparing of the first polymer further comprises at least one monomer that does not comprise an acid group selected from the group consisting of a C1 to C10 alkyl acrylate, a C1 to C10 alkyl methacrylate, and any mixture thereof.

5. The process according claim 1, wherein at least 60% by weight of monomers employed in preparing the polymer dispersion are selected from the group consisting of a C1 to C20 alkyl acrylate, a C1 to C20 alkyl methacrylate, a vinyl ester of a carboxylic acid comprising up to 20 C atoms, a vinylaromatic having up to 20 C atoms, an ethylenically unsaturated nitrile, a vinyl halide, a vinyl ether of at least one alcohol comprising 1 to 10 C atoms, an aliphatic hydrocarbon having 2 to 8 C atoms and one or two double bonds, and any mixture thereof.

6. The process according to claim 1, wherein:
the monomer comprising an acid group is acrylic acid;
the monomer in preparing the first polymer further comprises ethyl acrylate; and
at least 80% by weight of the monomers in preparing the polymer dispersion are selected from the group consisting of a C1 to C10 alkyl acrylate, a C1 to C10 alkyl methacrylate, a styrene, and any mixture thereof.

7. The process according to claim 1, wherein a glass transition temperature of monomers of the polymerization of the second composition is from $-19°$ C. to $+15°$ C.

8. The process according to claim 1, wherein a glass transition temperature of a polymer of the polymer dispersion is from $-15°$ C. to $+15°$ C.

9. The process according to claim 1, wherein the preparing the first polymer comprises regulating molecular weight with a molecular weight regulator.

10. The process according to claim 1, wherein a weight ratio of an amount of monomers in preparing the first polymer to an amount of monomers in preparing the polymer dispersion is from 5:95 to 50:50.

11. The process according to claim 1, wherein the preparing of the first polymer occurs in the presence of a seed latex.

12. The process according to claim 1, wherein the monomers in preparing the polymer dispersion comprise less than 5% by weight or no monomers with acid groups.

13. An aqueous polymer dispersion obtained by the process according to claim 1.

* * * * *